United States Patent
Hsu et al.

(10) Patent No.: US 7,299,045 B2
(45) Date of Patent: Nov. 20, 2007

(54) CELL RESELECTION METHOD FOR A MOBILE SUBSCRIBER

(75) Inventors: Chao-Yuan Hsu, Taipei (TW); Yao-Ting Hsieh, Tai-Chung (TW); Chu-Ching Yang, Tainan County (TW)

(73) Assignee: BenQ Corporation, Shan-Ting Tsun, Gueishan Hsiang, Teoyuan County (TW)

( * ) Notice: Subject to any disclaimer, the term of this patent is extended or adjusted under 35 U.S.C. 154(b) by 174 days.

(21) Appl. No.: 11/161,435

(22) Filed: Aug. 3, 2005

(65) Prior Publication Data

US 2006/0030324 A1 Feb. 9, 2006

(30) Foreign Application Priority Data

Aug. 4, 2004 (TW) ............................... 93123381 A (51) Int. Cl.
*H04Q 7/20* (2006.01)
(52) U.S. Cl. ..................... 455/437; 455/435.2; 455/525
(58) Field of Classification Search ............. 455/435.1, 455/435.2, 437, 525

See application file for complete search history.

(56) References Cited

U.S. PATENT DOCUMENTS

| | | | |
|---|---|---|---|
| 5,379,446 A | 1/1995 | Murase | |
| 5,640,677 A | 6/1997 | Karlsson | |
| 6,466,790 B2 * | 10/2002 | Haumont et al. | 455/437 |
| 2004/0097233 A1 | 5/2004 | Pecen | |
| 2004/0131037 A1 | 7/2004 | Balletti | |
| 2005/0107110 A1 * | 5/2005 | Vasudevan et al. | 455/525 |

* cited by examiner

*Primary Examiner*—Joseph Feild
*Assistant Examiner*—S. Smith
(74) *Attorney, Agent, or Firm*—Winston Hsu (57) ABSTRACT

A cell reselection method includes determining if a first C1 parameter corresponding to the serving cell is greater than a predetermined value. If the first C1 parameter is greater than the predetermined value, the method then determines if a second C2 parameter corresponding to a neighboring cell is greater than a sum of a first C2 parameter corresponding to the serving cell and a threshold value for a predetermined period. And if the second C2 parameter is greater than the sum of the first C2 parameter and the threshold for the predetermined time, cell reselection for the mobile subscriber is executed.

9 Claims, 6 Drawing Sheets

CELL RESELECTION METHOD FOR A MOBILE SUBSCRIBER

BACKGROUND OF THE INVENTION

1. Field of the Invention

The present invention relates to a cell reselection method for a mobile subscriber, and more specifically, to a cell reselection method for a mobile subscriber using a decision based on C1 and C2 parameters.

2. Description of the Prior Art

With the rapid development of wireless technology, wireless communication and personal mobile communication has become an integral part of daily life. Global System for Mobile Communication (GSM) is one of the most commonly used communication systems in the world. The widespread use of GSM cellular phones allows for an easier and more convenient way of communication. Within the communication range, people can talk to others anytime they want regardless of their current locations.

Figure 1:
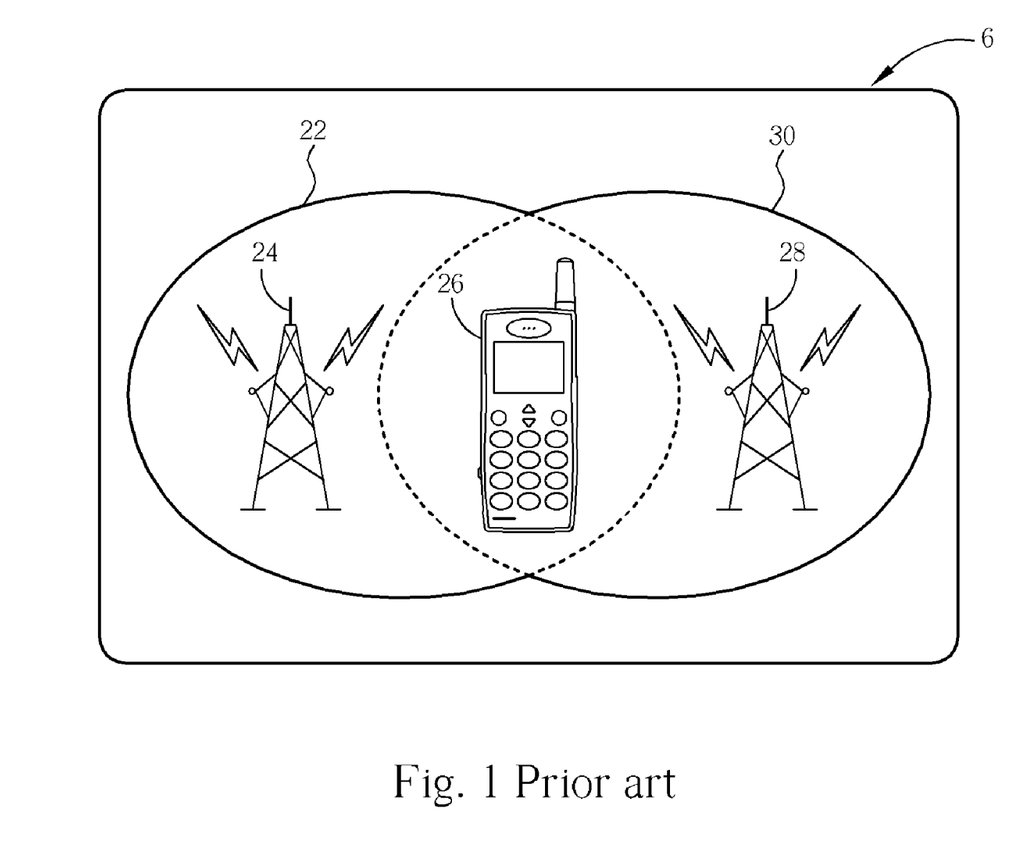
FIG. 1 is a diagram of a wireless communication system.

Please refer to FIG. 1. FIG. 1 is a diagram of a wireless communication system 6. Wireless communication system 6 comprises a plurality of cells (not shown in FIG. 1) within which a base station provides communication services. These cells are called cellular wireless communication systems because of their structural resemblance to honeycomb. For the ease of explanation, FIG. 1 comprises a cell 22 and a cell 30. A base station 24 provides communication services within cell 22 and a base station 28 provides communication services within cell 30. A mobile subscriber (MS) 26, located within both the service ranges of cell 22 and cell 30, is used to transmit and receive wireless communication signals and to communicate with the base stations. Since the MS 26 is located within the service range of both cell 22 and cell 30, the MS 26 can receive and send signals from/to base station 24 and base station 28 simultaneously. Usually the MS 26 chooses the base station capable of providing stronger signals as its serving cell, camps on the serving cell and starts to execute subsequent jobs. When the movement of the MS 26 causes a certain degree of change in the signal strength of the serving cell, the MS 26 will execute a confirming step of the current serving cell it is camping on. This confirming step is called cell selection using two parameters C1 and C2 for judgment wherein C1 is the path loss criterion and C2 is the cell reselection criterion. In the prior art, a serving cell having a positive C1 value and the highest C2 value corresponding to an MS is considered the best serving cell. So once an MS detects a base station of a higher C2 value than that of the current serving cell, it begins to perform cell reselection.

Figure 2:
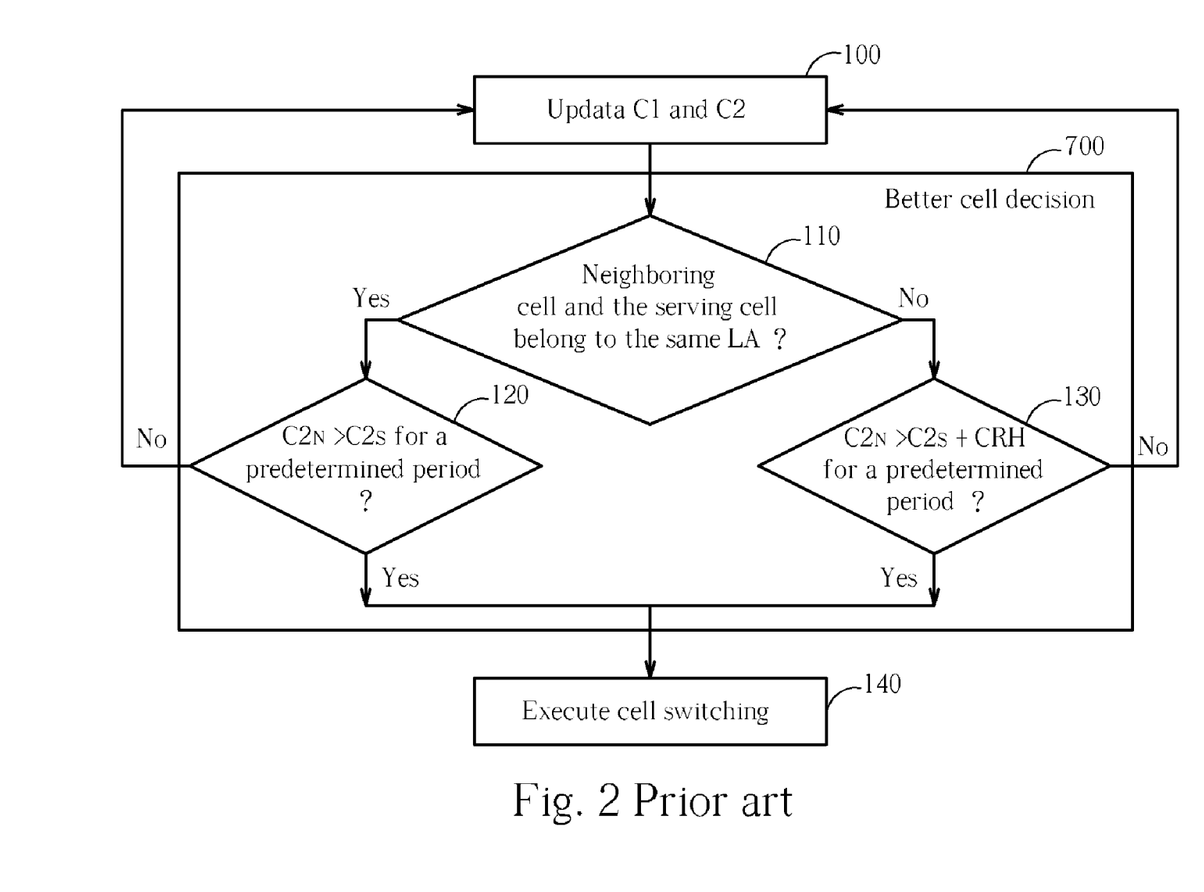
FIG. 2 is a flowchart illustrating a prior art cell reselection method of an MS

Please refer to FIG. 2. FIG. 2 is a flowchart illustrating a prior art cell reselection method of an MS. As previously described, a base station of the strongest signal strength will be selected as the serving cell of an MS. The MS calculates the C1 and C2 parameters of a base station based on the signals sent by the base station and these parameters are then used for the cell reselection process. According to European Telecommunications Standards Institute (ETSI) 05.08, the C1 parameter is defined as follows:

$$C1 = (A - \text{Max}(B, 0));$$

where $A = \text{RLA\_C} - \text{RXLEV\_ACCESS\_MIN}$;
$B = \text{MS\_TXPWR\_MAX\_CCH} - P$; and
RLA_C is the average power of the signal carrier wave;
RXLEV_ACCESS_MIN is related to the minimum signal that the operator wants the network to receive when being initially accessed by an MS;
MS_TXPWR_MAX_CCH is the maximum power that an MS may use when initially accessing the network;
P is the maximum output power of the MS.

If the C1 parameter of a base station is greater than zero, it means this base station is suitable for an MS to camp on, and the base station of the greatest C1 will be selected as the serving cell. If the MS is moving, indicating that the C1 parameter it detects also changes accordingly, or if a selected base station refuses to provide communication services for other reasons, the C2 parameter has to be taken into account for cell reselection. According to ETSI 05.08, the C2 parameter is defined as follows:

$$C2 = C1 + \text{CELL\_RESELECTION\_OFFSET} - \text{TEMPORARY OFFSET} * H(\text{PENALTY\_TIME} - T);$$

where for non-serving cells $H(x) = 0$ for $x < 0 = 1$ for $x \geq 0$; and for serving cells $H(x) = 0$.

CELL_RESELECTION_OFFSET is a value given to a cell to encourage or discourage an MS to reselect that cell. PENALTY_TIME is the time period during which a negative offset is given to C2 of a cell after an MS has put it on the list of the strongest cells. TEMPORARY_OFFSET is the amount of the negative offset given during the above-mentioned PENALTY_TIME.

After an MS has camped on a chosen serving cell, the MS periodically detects the signals of a plurality of neighboring cells and updates the C1 and C2 parameters. In FIG. 2 step 100 executes this procedure of updating C1 and C2. Step 110 judges if the neighboring cell and the serving cell belong to the same local area (LA). If in step 110 the judgment is "yes", then step 120 judges if the $C2_N$ parameter of the neighboring cell remains larger than the $C2_S$ parameter of the serving cell for a predetermined period. If in step 110 the judgment is "no", then step 130 judges if the $C2_N$ parameter of the neighboring cell remains larger than the sum of the $C2_S$ parameter of the serving cell and a first threshold broadcasted hysteresis value (CRH) for a predetermined period. In other words, step 130 judges if the equation $C2_N > C2_S + \text{CRH}$ holds for a predetermined period. If the judgment in step 120 or step 130 is "yes", step 140 then executes cell reselection. If the judgment in step 120 or step 130 is "no", then cell reselection is not executed and step 100 is repeated for updating C1 and C2. In FIG. 2 a process 700 including step 110, step 120 and step 130 is called better-cell decision.

Figure 3:
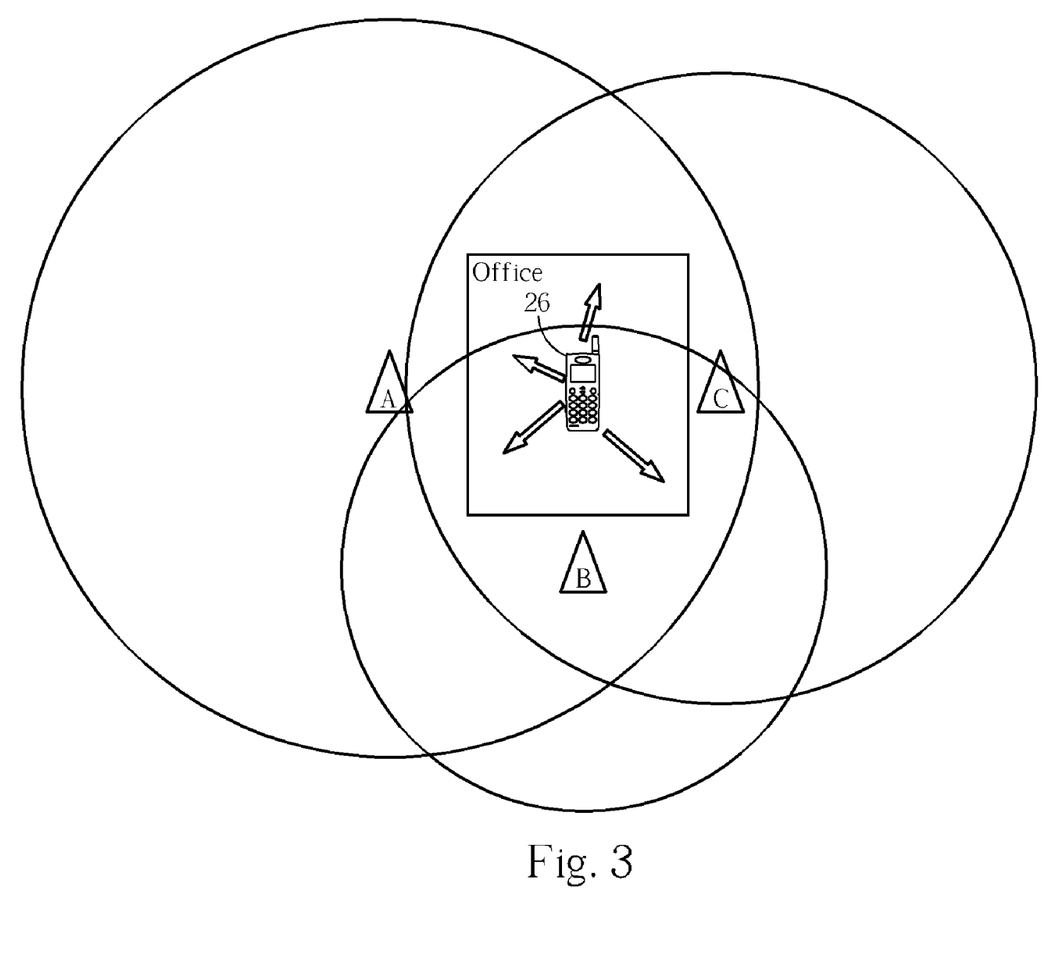
FIG. 3 is a diagram of a wireless communication system.

Please refer to FIG. 3. FIG. 3 is a diagram of a wireless communication system 50. In FIG. 3 The MS 26 is located within the service ranges of base station cell A, base station B and base station C at the same time. The user of the MS 26 is an employee working in an office, and the office is located in the intersection of cell ranges provided by base station A, base station B and base station C. If the MS 26 camps on base station A in the first place and the user moves slightly, the MS 26 might have to execute cell reselection and camp on to base station B. If the user frequently moves around within a small region in their office in a day, the MS 26 will perform several needless cell reselections and consume a lot of power. In fact, the MS 26 does not need cell reselection since within a small region, by camping on a fixed base station the MS 26 can receive good communication service without wasting power. However, the cell reselection method in the prior art cannot solve this problem.

SUMMARY OF THE INVENTION

It is therefore an objective of the claimed invention to provide a cell reselection method for a mobile subscriber in order to solve the above-mentioned problems.

According to the claimed invention, a cell reselection method for a mobile subscriber (MS) is disclosed. The method includes collecting a first C1 parameter and a first C2 parameter of the serving cell corresponding to the MS, and a second C2 parameter of a neighboring cell corresponding to the MS and comparing the first C1 parameter to a predetermined value. The method further includes if the first C1 parameter is smaller than the predetermined value, comparing a second location area code (LAC) of the neighboring cell to a first LAC of the serving cell, and if the second LAC and the first LAC are the same, comparing the second C2 parameter to the first C2 parameter. The method also includes if the second C2 parameter remains larger than the first C2 parameter for a first predetermined period, executing cell switching from the serving cell to the neighboring cell for the MS, and if the second LAC and the first LAC are not the same, comparing the second C2 parameter to a first parameter, and if the second C2 parameter remains larger than the first parameter for a second predetermined period, executing cell switching from the serving cell to the neighboring cell for the MS, wherein the first parameter is the sum of the first C2 parameter and a first threshold value.

These and other objectives of the present invention will no doubt become obvious to those of ordinary skill in the art after reading the following detailed description of the preferred embodiment that is illustrated in the various figures and drawings.

DETAILED DESCRIPTION

Figure 4:
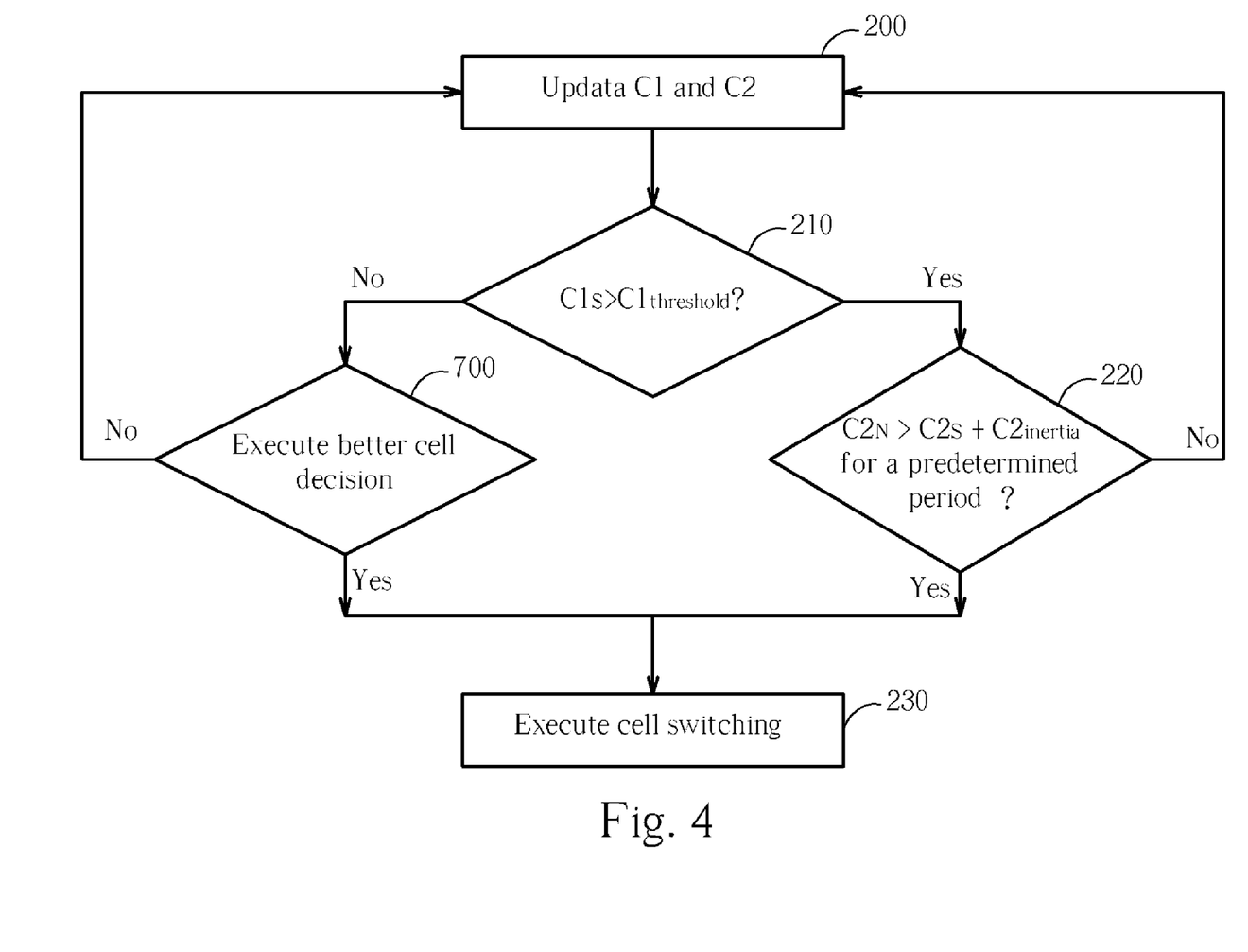
FIG. 4 is a flowchart of a cell reselection method for an MS according to the present invention.

Please refer to FIG. 4. FIG. 4 is a flowchart illustrating a cell reselection method for a mobile subscriber (MS) according to the present invention. In order to solve unnecessary cell reselections in the prior art and reduce power consumption, the present invention discloses a new judging procedure based on C1 and C2 parameters. In FIG. 4 step 200 updates C1 and C2 parameters and step 210 judges if the $C1_S$ parameter of the serving cell is greater than a predetermined value $C1_{threshold}$. If in step 210 the judgment is "yes", then step 220 judges if the $C2_N$ parameter of a neighboring cell remains larger than the sum of the $C2_S$ parameter of the serving cell and a threshold value $C2_{inertia}$ for a predetermined period. In other words, step 220 judges if the equation $C2_N > C2_S + C2_{inertia}$ holds for the predetermined period. If $C2_N$ remains larger than the sum of $C2_S$ and $C2_{inertia}$ for the predetermined period, it means the neighboring cell provides better service worthy of cell reselection, or the MS remains camping on the same serving cell. If in step 210 the judgment is "no", then the steps in process 700 illustrated in FIG. 2 are executed. If the judgments in process 700 and in step 220 are both "yes", then cell reselection is executed; if a judgment in process 700 or in step 220 is "no", then cell reselection is not executed and step 200 is repeated for updating C1 and C2.

Figure 5:
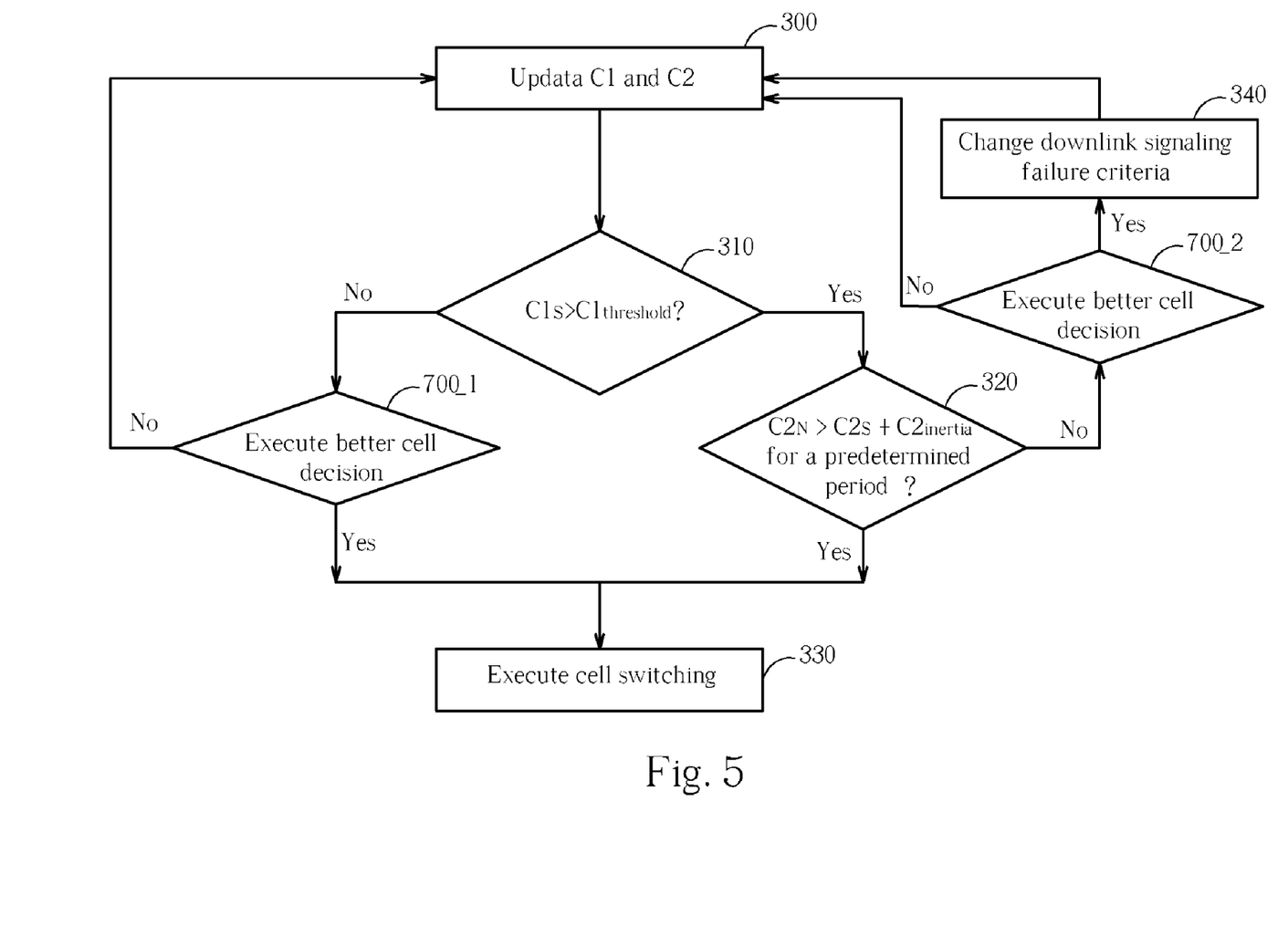
FIG. 5 is a flowchart of another cell reselection method for an MS in the present invention.

Please refer to FIG. 5. FIG. 5 is a flowchart illustrating another cell reselection method for an MS in the present invention. In FIG. 5 step 300 updates C1 and C2 parameters and step 310 judges if $C1_S$ is greater than $C1_{threshold}$. If in step 310 the judgment is "yes", then step 320 judges if the equation $C2_N > C2_S + C2_{inertia}$ holds for a predetermined period, wherein the $C2_N$ parameter corresponds a neighboring cell, $C2_S$ parameter corresponds to the serving cell and $C2_{inertia}$ is a threshold value. If in step 310 the judgment is "no", then process 700_1 is executed wherein process 700_1 is process 700 illustrated in FIG. 2. If the judgments in process 700_1 and in step 320 are both "yes", then cell reselection is executed; if the judgment in process 700_1 is "no", then cell reselection is not executed and step 300 is repeated for updating C1 and C2.

FIG. 5 differs from FIG. 4 in that if the judgment in step 320 is "no", a process 700_2 is executed wherein process 700_2 is process 700 illustrated in FIG. 2. If the judgment in process 700_2 is "no", then step 300 is repeated for updating C1 and C2. If the judgment in process 700_2 is "yes", then step 340 is executed to change criteria for downlink signaling failure. Downlink signaling failure means when an MS has been identified and a suitable base station for cell reselection has been confirmed, but due to other reasons, such as probable interference, the MS cannot camp on the chosen base station. After the criteria for downlink signaling failure has been changed, step 300 is repeated for updating C1 and C2.

Figure 6:
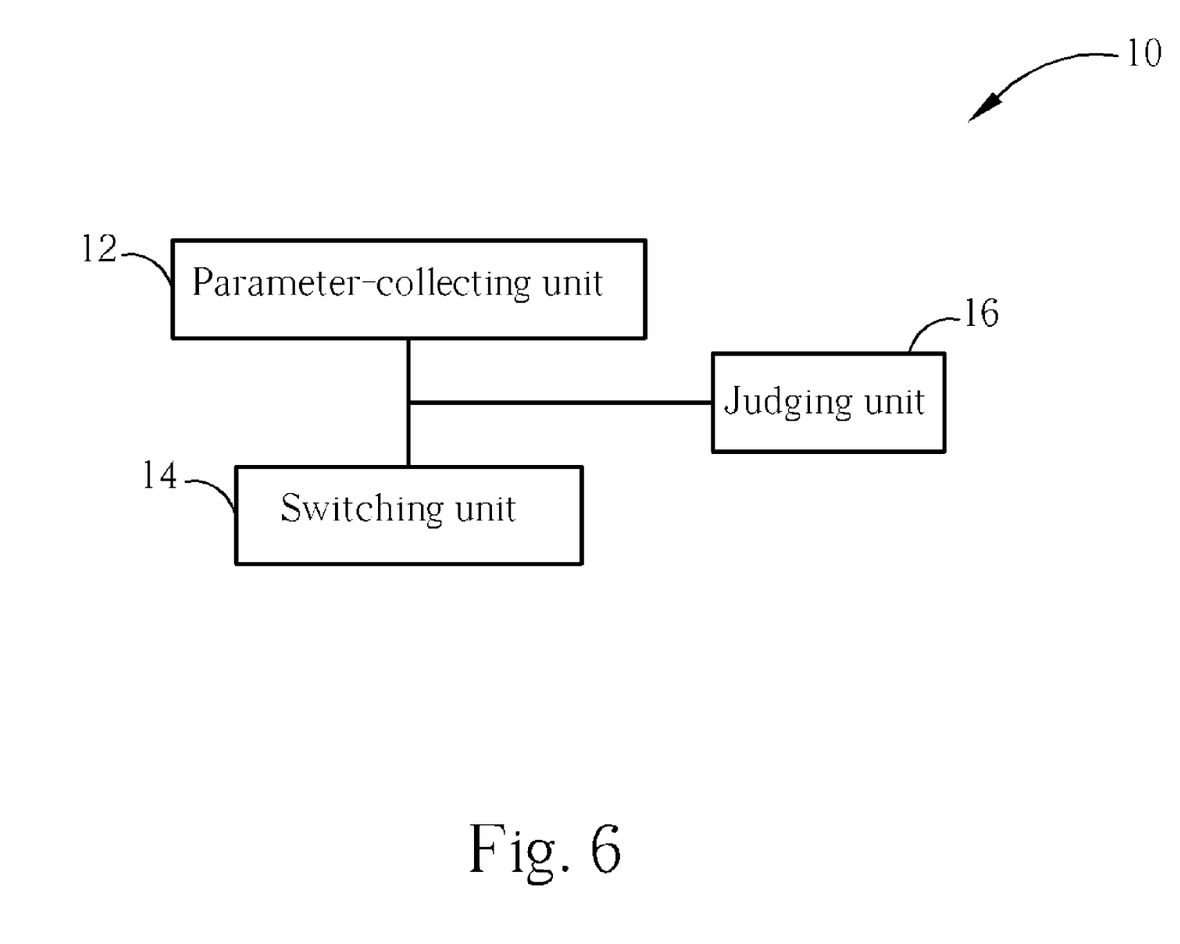
FIG. 6 is a diagram of an MS according to the present invention.

Please refer to FIG. 6. FIG. 6 is a diagram of an MS 10 according to the present invention. The MS 10 receives wireless signals from a serving cell and a neighboring cell. The MS 10 includes a parameter-collecting unit 12, a switching unit 14 and a judging unit 16. The parameter-collecting unit 12 collects a first C1 parameter, a first C2 parameter $C2_S$ and a second C2 parameter $C2_N$, wherein the first C1 parameter and the first C2 parameter $C2_S$ correspond to the serving cell, and the second C2 parameter $C2_N$ corresponds to the neighboring cell. The switching unit 14 switches base stations during cell reselection. The judging unit 16 compares the C1 parameter to a first predetermined value. If the first C1 parameter is smaller than the first predetermined value, then a better-cell decision is executed; if the first C1 parameter is larger than the first predetermined value, the judging unit 16 compares the second C2 parameter $C2_N$ to a second parameter, and if $C2_N$ is larger than the second parameter which is the sum of $C2_N$ and a second threshold value, a signal is sent to the switching unit 14 for cell reselection. The better-cell decision illustrated in process 700 of FIG. 2 is described as follows:

(a) if the first C1 parameter is smaller than the predetermined value, compare a first location area code (LAC) of the serving cell to a second LAC of the neighboring cell;

(b) if the first LAC and the second LAC are the same, compare the second C2 parameter to the first C2 parameter; and if the second C2 parameter remains larger than the first C2 parameter for a first predetermined period, send a signal to the switching unit; and (c) if the second LAC and the first LAC are not the same, compare the second C2 parameter to a first parameter; and if the second C2 parameter remains larger than the first parameter for a second predetermined period, send a signal to the switching unit, wherein the first parameter is the sum of the first C2 parameter and a first threshold value.

In the prior art cell reselection method, cell reselection is executed frequently when an MS moves a lot within a small region located at the intersection of several cells provided by different base stations. In fact an MS can receive high quality communication service by camping on the same cell despite its frequent movement. These cell reselections are unnecessary and waste a lot of power. The present invention provides a more efficient method with a stricter condition for executing cell switching by adjusting C1 and C2 judging criteria. The cell reselection method in the present invention reduces the unnecessary cell reselections in the prior art and has the advantage of low power consumption.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A cell reselection method for a mobile subscriber, the mobile subscribe receiving signals from a serving cell and a neighboring cell, the method comprising:

(a) collecting a first C1 parameter and a first C2 parameter of the serving cell corresponding to the mobile subscriber, and a second C2 parameter of the neighboring cell corresponding to the mobile subscriber;

(b) comparing the first C1 parameter to a predetermined value;

(c) if the first C1 parameter is smaller than the predetermined value, comparing a second location area code (LAC) of the neighboring cell to a first LAC of the serving cell;

(d) if the second LAC and the first LAC are the same, comparing the second C2 parameter to the first C2 parameter, and if the second C2 parameter remains larger than the first C2 parameter for a first predetermined period, executing cell switching from the serving cell to the neighboring cell for the mobile subscriber;

(e) if the second LAC and the first LAC are not the same, comparing the second C2 parameter to a first parameter, and if the second C2 parameter remains larger than the first parameter for a second predetermined period, executing cell reselection from the serving cell to the neighboring cell for the mobile subscriber, wherein the first parameter is the sum of the first C2 parameter and a first threshold value; and (f) if the first C1 parameter is larger than the predetermined value, comparing the second C2 parameter to the first C2 parameter, and if the second C2 parameter remains larger than the second parameter for a third predetermined period, executing cell switching from the serving cell to the neighboring cell for the mobile subscriber, wherein the second parameter is the sum of the first C2 parameter and a second threshold value.

2. The method of claim 1 further comprising if the second C2 parameter does not remain larger than the second parameter for the third predetermined period, repeating step (a).

3. The method of claim 1 wherein step (b) further comprises:

(g) according to step (b) if the first C1 parameter is larger than the predetermined value, comparing the second C2 parameter to a second parameter, and if the second C2 parameter does not remain larger than the second parameter for a third predetermined period, and repeating steps (c) through (e), wherein the second parameter is the sum of the first C2 parameter and a second threshold value.

4. The method of claim 1 further comprising if the second C2 parameter does not remain larger than the first C2 parameter for the first predetermined period in step (d), repeating step (a).

5. The method of claim 1 further comprising if the second C2 parameter does not remain larger than the first parameter for the second predetermined period in step (e), repeating step (a).

6. The method of claim 1 wherein C1 is defined as:

$$C1=(A-\text{Max}(B,0));$$

where $A=\text{RLA\_C}-\text{RXLEV\_ACCESS\_MIN}$;
$B=\text{MS\_TXPWR\_MAX\_CCH}-P$; and
RLA_C is the average power of the signal carrier wave;
RXLEV_ACCESS_MIN is related to the minimum signal that the operator wants the network to receive when being initially accessed by an MS;
MS_TXPWR_MAX_CCH is the maximum power that an MS may use when initially accessing the network;
P is the maximum output power of the MS.
and C2 is defined as:

$$C2=C1+\text{CELL\_RESELECTION\_OFFSET}-\text{TEMPORARY OFFSET}*H(\text{PENALTY\_TIME}-T);$$

where for non-serving cells $H(x)=0$ for $x<0$ =1 for $x\geq 0$; and for serving cells $H(x)=0$;

where CELL_RESELECTION_OFFSET is a value given to a cell to encourage or discourage an MS to reselect that cell;
PENALTY_TIME is the time period during which a negative offset is given to C2 of a cell after an MS has put it on the list of the strongest cells; and
TEMPORARY_OFFSET is the amount of the negative offset given during the above-mentioned PENALTY_TIME.

7. A mobile subscriber for receiving wireless signals from a serving base station and a neighboring cell, comprising:

a parameter collecting unit for collecting a first C1 parameter, a first C2 parameter and a second C2 parameter, wherein the first C1 parameter and the first C2 parameter correspond to the serving cell and the second C2 parameter corresponds to the neighboring cell;

a switching unit for switching base stations; and a judging unit for comparing the value of the first C1 parameter and a first parameter, wherein if the first C1 parameter is smaller than a first predetermined value, executing a better cell decision, if the first C1 parameter is larger than the first predetermined value, comparing the second C2 parameter to a second parameter, and if the second C2 parameter remains larger than the second parameter for a third predetermined period, sending a signal to the switching unit to execute cell switching from the serving cell to the neighboring cell for the mobile subscriber, wherein the second parameter is the sum of the first C2 parameter and a second threshold value.

8. The mobile subscriber of claim 7 wherein in the better-cell decision, the judging unit executes a procedure comprising:
- if the first C1 parameter is smaller than the predetermined value, comparing a second location area code (LAC) of the neighboring cell to a first LAC of the serving cell;
- if the second LAC and the first LAC are the same, comparing the second C2 parameter and the first C2 parameter, and if the second C2 parameter remains larger than the first C2 parameter for a first predetermined period, sending a signal to the switching unit; and
- if the second LAC and the first LAC are not the same, comparing the second C2 parameter and the first parameter, and if the second C2 parameter remains larger than the first parameter for a second predetermined period, sending a signal to the switching unit, wherein the first parameter is the sum of the first C2 parameter and a first threshold value.

9. The mobile subscriber of claim 7 wherein C1 is defined as:

$$C1 = (A - \mathrm{Max}(B,0));$$

where $A = \mathrm{RLA\_C} - \mathrm{RXLEV\_ACCESS\_MN}$;
$B = \mathrm{MS\_TXPWR\_MAX\_CCH} - P$; and
RLA_C is the average power of the signal carrier wave;
RXLEV_ACCESS_MN is related to the minimum signal that the operator wants the network to receive when being initially accessed by an MS;
MS_TXPWR_MAX_CCH is the maximum power that an MS may use when initially accessing the network;
P is the maximum output power of the MS.

and C2 is defined as:

$$C2 = C1 + \mathrm{CELL\_RESELECTION\_OFFSET} - \mathrm{TEMPORARY\ OFFSET} * H(\mathrm{PENALTY\_TIME} - T);$$

where for non-serving cells $$H(x) = 0 \text{ for } x<0 = 1 \text{ for } x \geq 0; \text{ and}$$

for serving cells $$H(x) = 0;$$

where CELL_RESELECTION_OFFSET is a value given to a cell to encourage or discourage an MS to reselect that cell;
PENALTY_TIME is the time period during which a negative offset is given to C2 of a cell after an MS has put it on the list of the strongest cells; and
TEMPORARY_OFFSET is the amount of the negative offset given during the above-mentioned PENALTY_TIME.

* * * * *